July 8, 1930.  M. M. TITTERINGTON  1,770,244
AIRCRAFT STEERING SYSTEM
Original Filed Sept. 4, 1924  4 Sheets-Sheet 1

Inventor:
Morris M. Titterington

July 8, 1930. M. M. TITTERINGTON 1,770,244
AIRCRAFT STEERING SYSTEM
Original Filed Sept. 4, 1924 4 Sheets-Sheet 4

Inventor
Morris M. Titterington

Patented July 8, 1930

1,770,244

UNITED STATES PATENT OFFICE

MORRIS M. TITTERINGTON, OF BROOKLYN, NEW YORK, ASSIGNOR, BY MESNE ASSIGNMENTS, TO PIONEER INSTRUMENT COMPANY, INCORPORATED, OF BROOKLYN, NEW YORK, A CORPORATION OF NEW YORK

AIRCRAFT-STEERING SYSTEM

Application filed September 4, 1924, Serial No. 735,889. Renewed December 5, 1929.

This invention relates to a mechanism for, and a system of, steering aircraft or other dirigible vehicles.

A purpose of this invention is to provide means, as a navigation instrument for steering aircraft, or other vehicles, whereby such craft or vehicles may be safely steered at night, in fog, or clouds, or under other conditions, without reference to objects external to the craft or vehicle. A particular object is to provide a steering instrument or system embodying a combination of indicators which produce similar indications for one direction of travel and which produce dissimilar indications for the opposite direction of travel. Other objects and advantages will appear as the invention is hereinafter disclosed.

While a practical embodiment of this invention is shown in the drawings and disclosed in this specification, it will be understood that various modifications may be resorted to without departing from the scope of the appended claims.

Referring to the drawings which illustrate a preferred form of the invention:

Figure 2:
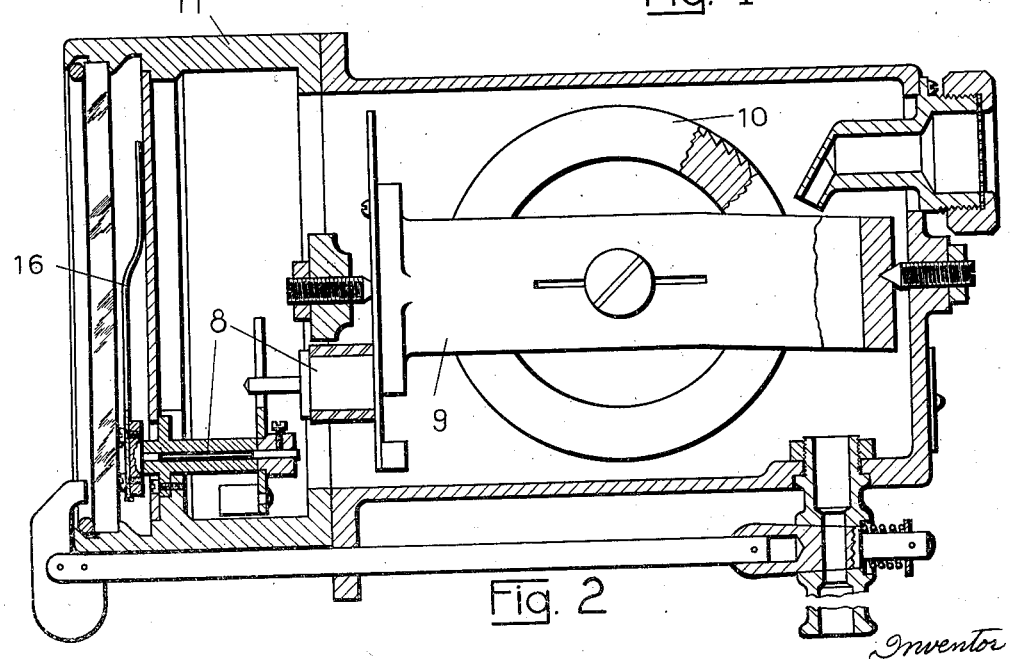
Figure 2 represents a side-elevation of the turn indicating element of the indicating parts shown in Figure 1 in section on the line 2—2.

Referring to the drawings, the indicating parts of the system consist of an indicator of angular motion (turn indicator) 11, an indicator of electric potential 12 and an indicator of direction 13. Turn indicator 11 is shown in section in Figure 2. This is of the gyroscopic type in which the precession of a gyroscope, which is caused by angular motion about a vertical axis, is restrained by a spring or by other means. Such instruments are disclosed in patents to E. A. Sperry 1,407,491 and to L. B. Sperry 1,433,102 in the patents of C. H. Colvin, Numbers 1,610,930, Dec. 14, 1926, and 1,660,152, Feb. 21, 1928, and also in the joint application of C. H. Colvin and M. M. Titterington, Serial Number 674,489, filed Nov. 13, 1923. No claim is here made to the turn indicator per se, but as an element of the complete steering system.

Figure 3:
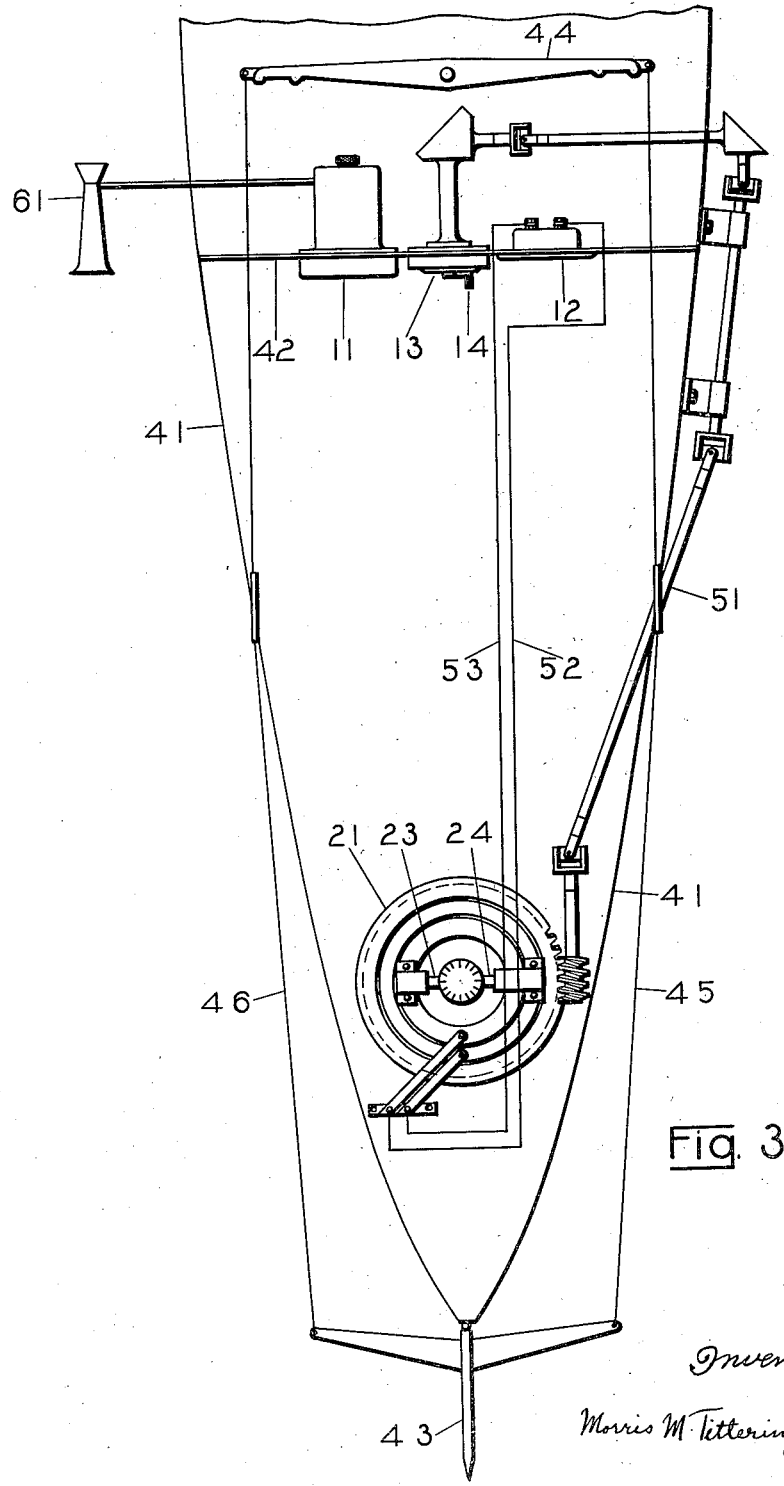
Figure 3 represents a plan view, partially diagrammatic, of the complete steering system.
Figure 4:
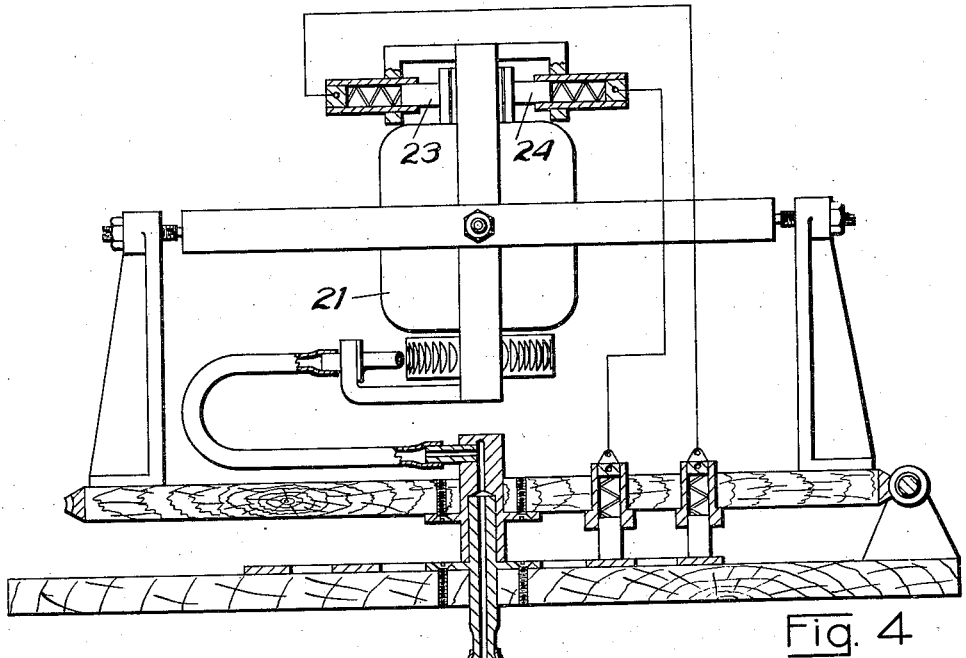
Figure 4 represents an elevation of the generator element of the directive part of the system.

The potential indicator 12 and the direction indicator 13 cooperate with generator 21 shown in Figures 3 and 4. These elements comprise a compass of the earth inductor type, as disclosed and claimed in applicant's co-pending application Serial Number 542,937, filed March 11, 1922.

Figure 5:
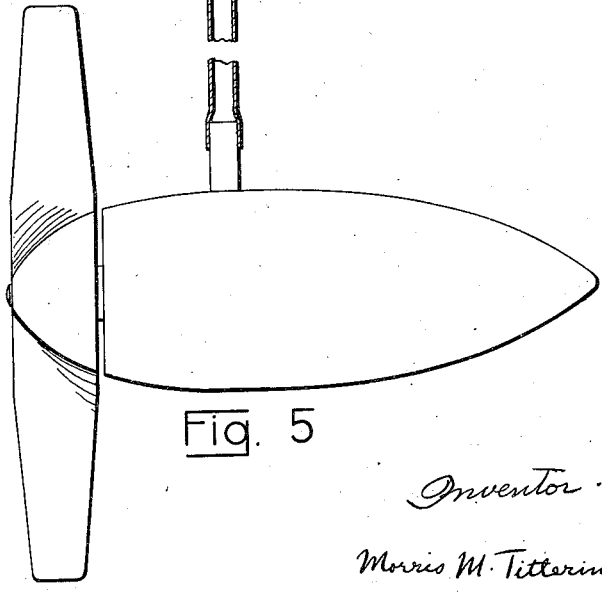
Figure 5 represents an impeller-operated pump for supplying air to drive the generator element.

Figure 3 shows, diagrammatically, the installation of the steering system on an airplane. The fuselage 41 of the airplane carries an instrument board 42 on which the indicating instruments 11, 12 and 13 are mounted. At the rear of the fuselage is a rudder 43 which is attached to rudder bar 44 by cables 45 and 46. Mounted on the fuselage is generator 21 which is mechanically connected to the direction indicator 13 by means of shafting 51, and electrically connected to potential indicator 12 by wires 52 and 53. Generator 21 is rotated by air supplied from the pump, Figure 5, or by other appropriate means. A Venturi tube 61 is also mounted on the fuselage and is connected with the turn indicator 11. As the airplane flies, the passage of air through the Venturi tube causes a vacuum which draws the air out of the case of the turn indicator 11, and thereby furnishes the power for operating this indicator by spinning the gyroscope wheel 10 which, when it precesses, rotates the frame 9 the motion of which acts through transmission means 8 to swing the turn indicator hand 16 across the face of the instrument 11 in the same direction as the craft turns.

On the face of the direction indicator 13 is a hand crank 14 by means of which the shafting 51 and thereby the brushes 23 and 24 of the generator 21 are rotated. The crank 14 is suitably geared to the direction indicator dial 15 which is of the nature of a compass card so that the latter indicates the angle through which the generator brushes are rotated.

As explained in my co-pending application Serial Number 542,937, the earth inductor compass, comprising an electric potential indicator 12 and a direction indicator 13 as well as a generator 21, operates as follows:

The generator is located where it is as free as possible from local magnetic fields. If such fields do exist, however they may be compensated in precisely the same way as is well understood in respect to ordinary magnetic compasses. As the armature of the generator is revolved, electricity is generated and the potential at the brushes is indicated by the indicator of potential 12, except when the angular position of the brushes is such that the inductor plane of the armature 21 is perpendicular to a plane defined by the armature axis and the direction of the earth's flux. In the latter position the potential is zero. The indicator of direction 13 is so connected to the brush-gear of the generator, that the brushes 23 and 24 may be rotated into this zero potential position, and the angle of rotation indicated on the face of the direction indicator 13.

The interconnection of the direction indicator 13 and the brushes 23 and 24 is such that when the craft is headed north the direction indicator 13 shows north and the inductor plane of the armature is perpendicular to a plane defined by the axis of the armature and the direction of the earth's flux, and hence the potential at the brushes is zero, and the hand 17 of the electric potential indicator 12 stands at zero.

The operation of the compass is then as follows: The direction indicator 13 is set to indicate the desired course. The brushes, 23 and 24, being connected to rotate through the same angle as the indicator 13, are therefore moved through the angle indicated by the direction indicator dial 15. The craft is then steered until the potential indicator 12 shows zero, at which time the heading of the craft will be the direction indicated by the direction indicator 13 and which is the desired course originally set into the direction indicator dial 15 and as long as the potential indicator 12 shows a null reading the craft is on the desired course originally set into the direction indicator 13.

Figure 7:
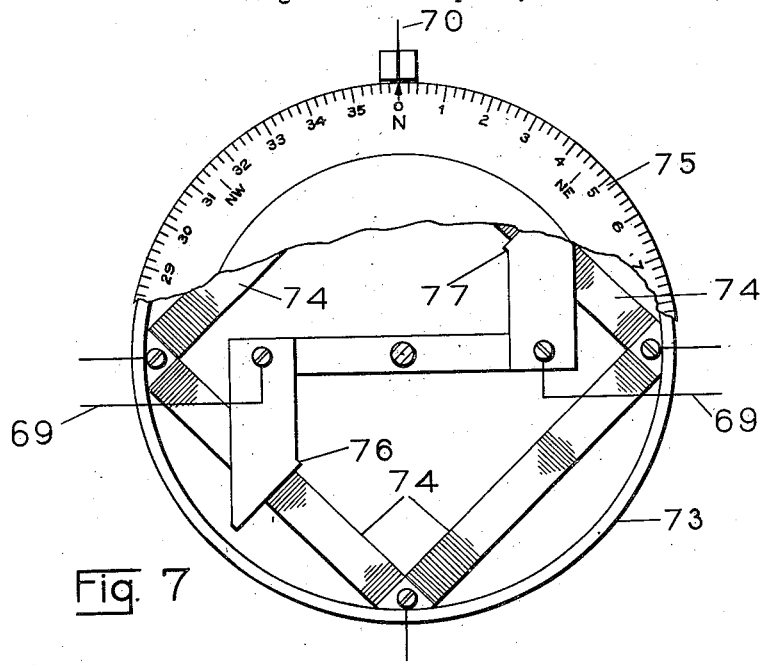
Figure 7 represents an elevation of the indicating part of the system shown in Figure 5.
Figure 6:
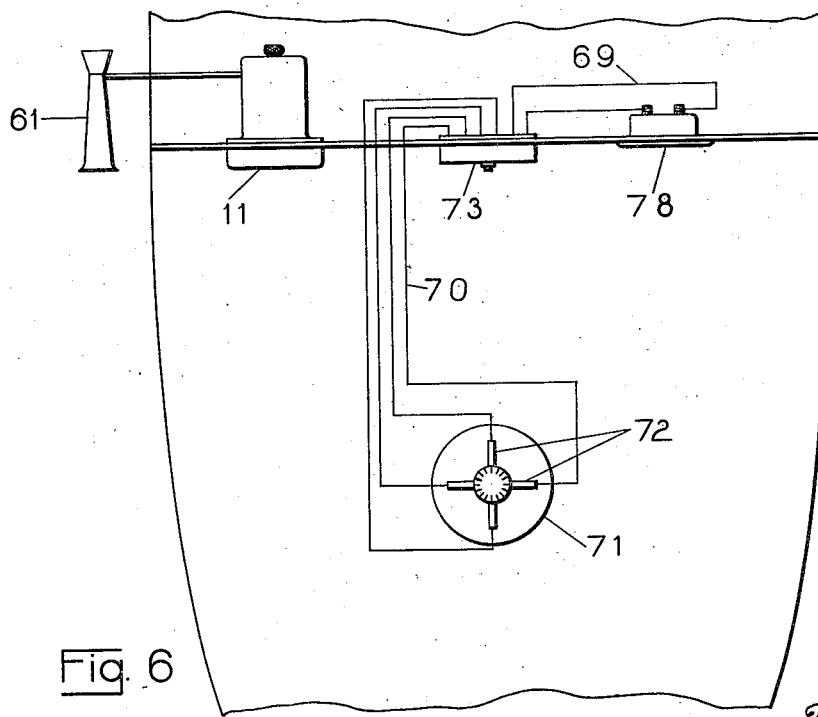
Figure 6 represents diagrammatically a plan view of an alternate form of system using a different type of generating and directive indicating apparatus.

Referring to Figures 6 and 7, I have illustrated an alternate form of earth inductor compass as an element of my steering system. In the generator 71 of this compass the brushes 72 are not rotatable, but are fixed in relation to the vehicle. The direction indicator 73 is in the form of a potential bridge 74, consisting of four sides, wound with resistance wire, the four brushes of the generator being electrically connected to the four corners of the bridge by wires 70. Rotatable about the center of the square is the direction indicator dial 75 to which is attached contact arms 76 and 77 which brush or rub against the bridge 74 and which are electrically connected by wires 69 to the indicator of electric potential 78 having a dial indicating face the same as the instrument 12 in Figure 1.

Figure 1:
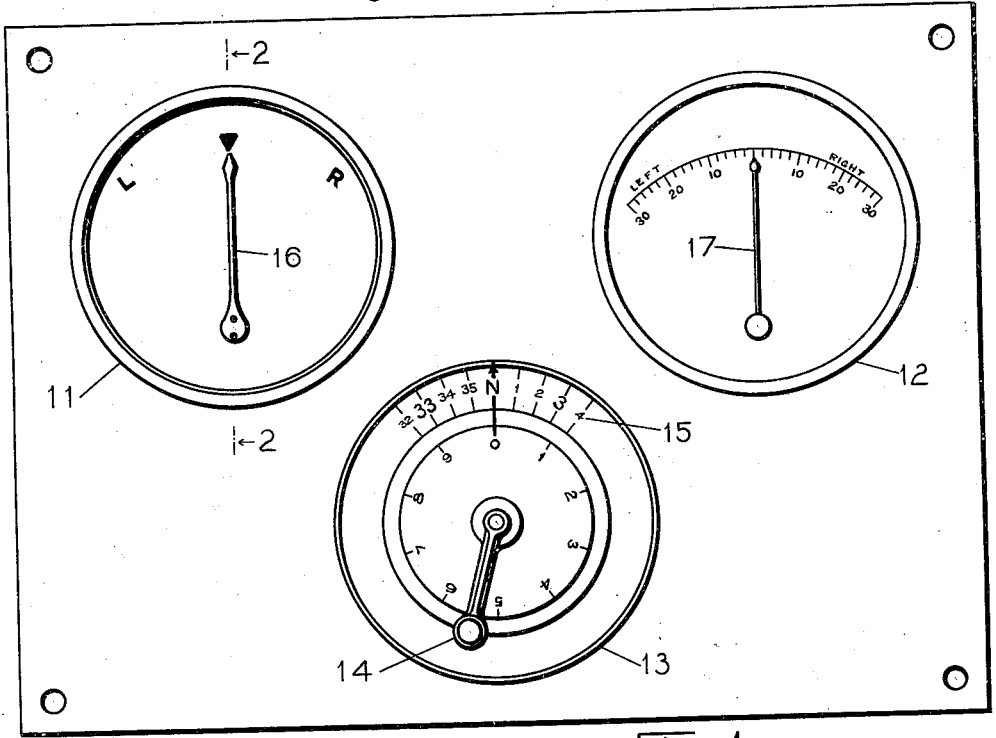
Figure 1 represents an elevation of the indicating parts of the steering system.

When the dial 75 of the direction indicator 73 is rotated to indicate the direction in which the vehicle is heading, the hand of the potential indicator 73 will be in its central position as in Figure 1. While this alternate form of earth inductor compass is in many ways inferior to that shown in Figures 1 to 5, its use for the purposes to be explained lies within the scope of this invention.

It will be noted that when the airplane is being flown in the direction shown by direction indicator 13, the hands 16 and 17 of indicators 11 and 12 will both be central. When the airplane turns to the right both hands will move to the right. When the airplane turns to the left, both hands will move to the left.

When the airplane is being flow in the direction exactly opposite to (180° removed from) that shown by direction indicator 13, the turn indicator hand 16 and potential indicator hand 17 will both be central. While flying in such opposite direction should the airplane turn to the right, the potential indicator hand 17 would then move to the left, while the turn indicator hand 16 would simultaneously move to the right. Similarly, when the airplane turns to the left, hand 17 would move to the right and hand 16 to the left since the hand 16 of the turn indicator always swings in the direction in which the craft turns.

That is, when the airplane is headed in the indicated direction both indicator hands 16 and 17 move together, but when the airplane is headed in the opposite direction the hands move oppositely. Since perfectly straight flight is rarely maintained for any appreciable period of time, the motion of these hands indicates to the pilot whether he is flying in the indicated direction or in the opposite direction.

The pilot need not, of course, depend upon the natural yawing of the airplane to impart motion to the indicating hands 16 and 17, but may induce such indication by slightly steering the airplane to right or left by means of rudder bar 44 and rudder 43.

By combining a turn indicator and a potential indicator into a single steering instrument, I have secured a new characteristic and a new utility not possessed by either indicator alone. The turn indicator 11, by itself, indicates the direction of turn only and not absolute direction. The potential indicator 12 indicates that the vehicle is headed in either one of two directions. The combination of these indicators informs the pilot in which one of these two directions he is headed, i. e., the two indicators 11 and 12 indicate positive direction but either indicator alone cannot do so.

To be more specific, suppose the direction indicator 13 to be set upon north, and both indicator hands 16 and 17 to be in their center positions. Now suppose that both hands are observed to move similarly, to the right. This signifies to the pilot that his craft was on the correct (north) course and has now veered slightly to the right (towards the east). But suppose only the turn indicating hand 16 had moved toward the right and the potential indicating hand 17 had moved to the left, i. e. they moved dissimilarly. This would have told the pilot that he was 180° off his course, that he was heading south instead of north, and that he had started a turn to the west, instead of to the east. And without this combination of indicators, assuming complete darkness, clouds, or fog, the pilot could not have told whether he was headed north or south, or was turning toward the east or toward the west.

It will also be understood that the indications of the two indicators may be so related that motion in opposite directions will be indicative of the set course and motion in the same direction will indicate the reverse course. It appears more logical to use similar or synchronous motion to indicate correctness and dissimilar or non-synchronous motion to indicate incorrectness, and the drawings and explanations have therefore been made upon this basis.

While the above description has been directed to the use of my system on an airplane, it will be understood that the system is not limited in application but may be applied to any dirigible vehicle.

Having thus disclosed and described my invention, what I claim as new and desire to protect by Letters Patent, is:

1. The combination with a craft, of steering indicating means therefor comprising an indicator of angular motion, an indicator of electric potential, a generator adapted to use the earth's flux as a field, current collecting brushes carried on the generator, electric conductors interposed between said brushes and said indicator of electric potential, said indicators being mounted for simultaneous observations and being so constructed that their indicating members proper will move in the same direction when the turns are away from one direction of travel and will move in opposite directions when the turns are away from the opposite direction of travel.

2. A steering system, comprising in combination with a vehicle to be steered, an indicator of turning, an indicator of electric potential, an indicator of direction, said two first named indicators mounted on the vehicle for simultaneous observation and being so constructed that their indicating members proper will move in the same direction when the turns are away from one direction of travel and will move in opposite directions when the turns are away from the opposite direction of travel of the vehicle, said third named indicator being manually adjustable and connected to a generator having the earth's flux as a field, electric connection between said generator and said potential indicator, the indications of said last two named indicators being simultaneously variable by the manual operation of said third named indicator, and the indications of said two first named indicators being simultaneously variable by the turning of said vehicle.

3. The combination with a craft of steering indicating means therefor comprising in combination, an electrical compass generator revolving in the earth's field, brushes mounted in fixed relation with the vehicle and cooperating with the generator, a direction indicator, a potential bridge contained therein, wires connecting the bridge with the generator brushes, a compass dial rotatably carried on the direction indicator, contact arms operable across the bridge during movement of the dial, wires connecting with the contact arms, a potential indicator connected with the wires and receiving current from the bridge, and a turn indicator being mounted for simultaneous observation with said potential indicator, said indicators being so constructed that their indicating members proper will move in the same direction when turns are away from one direction of travel and will move in opposite directions when the turns are away from the opposite direction of travel.

Signed at Brooklyn, in the county of Kings and State of New York, this 3rd day of September, A. D. 1924.

MORRIS M. TITTERINGTON.